United States Patent Office 3,288,762
Patented Nov. 29, 1966

3,288,762
CURING PROCESS AND COMPOSITION FOR
CHLOROSULFONATED POLYETHYLENE
John T. Maynard, Wilmington, Del., assignor to E. I. du Pont de Nemours and Company, Wilmington, Del., a corporation of Delaware
No Drawing. Filed Sept. 10, 1962, Ser. No. 222,612
15 Claims. (Cl. 260—79.3)

This invention relates to chlorosulfonated polyethylenes and to methods for their conversion to highly elastic manufactured articles. It relates more particularly to novel compositions to be used in carrying out this conversion or curing.

This application is a continuation-in-part of my copending application Serial Number 154,066, now abandoned, filed November 21, 1961.

Chlorosulfonated polyethylenes, containing chlorine and sulfur within definite ranges and based on polyethylenes within a certain range of molecular weights, constitute an important class of elastomers. When properly cured, they have good tensile and other physical properties and are exceptionally resistant to chemical attack, including oxidative degradation during outdoor exposure and exposure to ozone in the vicinity of electrical equipment, and to swelling by water and organic solvents. The usual method of curing (as described in U.S. Patents 2,416,060 and 2,416,061) is to compound with an oxide, hydroxide, or weak acid salt of certain polyvalent metals, a carboxylic acid such as that furnished by rosin, and an accelerator of the sulfur vulcanization of rubber, and then to heat under conditions similar to those used in the vulcanization of rubber. Although satisfactory, this curing system has several disadvantages. Large amounts of the metal compounds, up to 60%, are required, thus increasing the cost of the compound and limiting the other ingredients which may be added and also limiting the uses to which the cured product may be put. Similarly, the cost is further increased by the relatively large amounts (often 2%) of accelerators required. These accelerators, which almost always contain sulfur and give sulfur or hydrogen sulfide on heating, are responsible for several undesirable effects, such as the formation of black lead sulfide when lead compounds are present or in a lead press cure and also the formation of copper sulfide when the compound is vulcanized in contact with a copper surface, as in forming an insulation on copper wire. This last effect is often undesirable since the copper sulfide forms an effective bond between the wire and the applied coating and makes it difficult to strip off the coating when the wire is to be connected electrically.

It is an object of this invention to provide a novel method for curing chlorosulfonated polyethylenes. A further object is to provide novel curing compositions for chlorosulfonated polyethylenes. Another object is to provide cured, highly elastic chlorosulfonated polyethylenes. Other objects will appear hereinafter.

These and other objects of this invention are accomplished as follows where it has been found that a great variety of nitrogen compounds, characterized by the presence of at least one —NO group attached to a C or O atom, have a profound beneficial effect, when used in very small amounts, upon the curing of chlorosulfonated polyethylenes by means of the polyvalent metal compounds and carboxylic acid auxiliary agents previously mentioned. The nitrogen containing compounds consist of inorganic nitrites, organic nitro compounds, organic nitroso compounds and organic oximino compounds wherein at least one of the nitro, nitroso and oximino groups is directly attached to a carbon atom. Since the amount of nitrogen compound to be used is very small, it is advantageously incorporated in the elastomer compound in the form of a mixture with a relatively large amount of the auxiliary agents and/or inert fillers.

Accordingly one form of this invention relates to using novel curing aid compositions for curing chlorosulfonated polyethylenes. The compositions are composed of a fine powder comprising 0.2 to 10% by weight of at least one non-volatile compound selected from the group consisting of inorganic nitrites, organic nitro compounds, organic nitroso compounds and organic oximino compounds wherein at least one of said nitro, nitroso and oximino groups is directly attached to a carbon atom, the remainder of the composition being a solid monocarboxylic acid of a molecular weight above 200 and belonging to the aliphatic or cycloaliphatic series (preferably 20 to 60% by weight), and/or an inert finely divided filler for the chlorosulfonated polyethylene (preferably 30 to 70% by weight). Mixtures of the aliphatic and cycloaliphatic monocarboxylic acids can also be utilized with or without the finely divided filler.

The process involves curing elastomeric chlorosulfonated polyethylenes in the presence of (A) at least one of the group consisting of polyvalent metal oxides, hydroxides, or weak acid salts of said metals, and (B) of monocarboxylic acids of molecular weight above 200 and belonging to the aliphatic and cycloaliphatic series, with the proviso that from about 0.005 to about 0.5 part (per 100 parts by weight of the chlorosulfonated polyethylene) of at least one non-volatile nitrogen containing compound previously described is present during the curing process. This compound may be added separately or, preferably, as a component of the above curing aid composition. The curing temperature is preferably between 125 and 175° C.

The process of the present invention is particularly useful when the polyvalent metal compounds already referred to (i.e. polyvalent metal oxides, hydroxides and weak acid salts of these metals), particularly those of magnesium and lead, are used to cure the chlorosulfonated polyethylene.

The non-volatile, nitrogen-containing compounds defined above belong to many chemical classes. Thus they can be the entirely inorganic metallic nitrites, or can be organic, either aliphatic or aromatic, substituted with at least one of the following groups: nitro, nitroso, or oximino wherein at least one of said groups is directly attached to a carbon atom. When the compounds themselves are acidic, for example nitrosophenols, it is convenient to use their metal or amine salts, particularly when the free acid itself is unstable. Non-volatile in the sense used in this invention means having an atmospheric boiling point above about 300° C.

The following nitrogen containing compounds of this invention are of particular practical interest: metallic nitrites, particularly those of the alkali and alkaline earth metals; organic nitroso compounds, particularly aromatic, with or without other functional groups, such as dinitroso benzene, nitroso phenols, and nitroso amines, in which another nitroso group may be on the nitrogen as well as the necessary nitroso group on the aromatic nucleus, as in N-nitroso-p-nitroso-N-methylaniline; organic nitro compounds, particularly aromatic, with or without functional groups, such as dinitrobenzene, dinitrotoluene, and dinitrobenzoic acid; organic oximes, such as benzoquinone dioxime and its dibenzoyl derivative; and nitrosates and nitrosites, made by the action of $NO_2$ and $N_2O_3$ respectively on olefinic compounds thereby producing nitrosates and nitrosites which contain two nitrogen atoms. According to the starting material and conditions of reaction, these nitrosate and nitrosite compounds contain, nitroso, nitro, nitrate, nitrite, and oximino groups.

The acids used in the above mixed curing aid are illustrated by lauric, palmitic, stearic, behenic, and the higher fatty acids, and by the abietic and other natural rosin acids as well as those derived from rosin by hydrogenation, by disproportionation, and by polymerization. The acids often referred are polymerized rosin and hydrogenated rosin. Commercial grades of these are known as "Polypale" and "Staybelite."

The inert filler serves as an additional diluent for the active nitrogen compound and to increase the ease of handling of the carboxylic acid ingredient, particularly when it is a rosin, which tends to be somewhat sticky. This inert filler may be any of the solid inorganic materials used in the compounding of chlorosulfonated polyethylene with the exception of the metal oxides, hydroxides, and weak acid salts of U.S. Patents 2,416,060 and 2,416,061, which react with the sulfonic acid chloride groups. The inert fillers therefore include alkaline earth sulfates, silcates such as the clays, ground mica, talc, asbestine, and precipitated calcium silicate, silica, graphite, and carbon black. Accordingly, the term "inert" as used above means chemically inert toward the chlorosulfonated polyetheylene and does not exclude materials such as carbon black which have a physical reinforcing action thereon.

The ingredients of the mixed curing aid should be reduced, either before or after mixing with each other, to the size range conventional for rubber compounding ingredients. In general, they should pass almost entirely through a 325 mesh screen. The grinding, comminuting, and mixing may be carried out in the equipment commonly used for the purpose.

The following examples will better illustrate the nature of the present invention; however, the invention is not intended to be limited to these examples. Parts are by weight unless otherwise indicated.

*Example 1*

The curing mixture is made by intimately mixing as dry powders 70 parts of a commercial grade of hydrogenated rosin, 28.6 parts of hydrated calcium silicate and 1.4 parts of dinitrotoluene. The silicate and dinitrotoluene after mixing are fine enough to pass almost completely through a 325 mesh screen.

This mixture is used in the curing of a chlorosulfonated polyethylene elastomer containing about 35% chlorine and about 1% sulphur and made from a linear polyethylene of density 0.96. It is compounded as follows, using a conventional rubber mill,

|  | Parts |
| --- | --- |
| Elastomer | 100 |
| Litharge (PbO) | 25 |
| Titanium dioxide | 50 |
| Curing mixture | 7 | and cured for 30 minutes at 153° C., giving well cured, very light colored slabs from which test pieces are cut. These give the following average values:

| | | |
| --- | --- | --- |
| Stress at 100% elongation | lbs./sq. in. | 710 |
| Tensile strength | lbs./sq. in. | 3980 |
| Elongation at break | percent | 460 |

In comparison, the same chlorosulfonated polyethylene compound with 2 parts of dipentamethylene thiuram tetrasulfide and 0.5 part of benzothiazyl disulfide instead of the 7 parts of curing mixture above, gives a stress of only 280 and a tensile strength of only 3640, with an elongation at break of 480%. Without either of these disulfides no cure at all is obtained. Thus the 0.1 part of active ingredient in the curing aid of the present invention gives a much greater effect than the 2.5 parts of vulcanization accelerators of the prior art. Addition of rosin to the latter curing system did not significantly alter the results. Alternatively, the dinitrotoluene (10 parts) is mixed with rubber maker's clay (90 parts) and one part of this mixture is used with 5 parts of hydrogenated rosin in the above formulation instead of the 7 parts of curing mixture. Results are similar.

*Example 2*

The curing mixture is made by intimately mixing as dry powders 56 parts of hydrogenated rosin and 40 parts of rubber maker's clay containing 4 parts sodium nitrite, prepared by wetting clay with the required amount of aqueous sodium nitrite solution, drying and crushing to a powder.

One hundred parts of the chlorosulfonated polyethylene used in Example 1 is compounded with 8 parts of magnesium hydroxide, 50 of titanium dioxide, and 8 of the above curing mixture and cured for 30 minutes at 163° C., resulting in a well cured product as in Example 1. The stress for 100% elongation is 540 lbs./sq. in., the tensile strength 3770 and the elongation at break 580%.

*Examples 3–11*

As shown in the following table, a representative group of the nitrogen compounds discussed above, mixed with 5 parts of hydrogenated rosin in the proportions indicated, is used to cure 100 parts of the chlorosulfonated polyethylene used in Example 1, compounded likewise with 25 parts of litharge and 50 of titanium dioxide. The table gives the physical properties of the resulting cured products and also the molar ratios of the nitrogen compound to the sulfonic acid chloride groups.

Similar results are obtained when the above compounds are used as in Example 2 and when the chlorosulfonated polyethylene used in the above examples is replaced by one made from a branched polyethylene of density 0.92. The cures obtained in these cases likewise compare favorably with the best obtained with this elastomer using the large proportions of vulcanization accelerators hitherto required.

It will be noted that the excellent cure obtained in the Example 2 results from the use of only 8 parts of Mg(OH)$_2$. This is equivalent to about 5 parts of MgO which is considerably smaller than the 10 to 20 parts recommended in U.S. Patents 2,416,060 and 2,416,061 referred to above.

| Ex. No. | Nitrogen Compound | Amt. | Percent in rosin Composition | Mole ratio N compd: —SO$_2$Cl | Stress 100%, p.s.i. | Tensile Strength, p.s.i. | Elongation at break, percent |
| --- | --- | --- | --- | --- | --- | --- | --- |
| 3 | Sodium nitrite | 0.1 | 2 | 1:22 | 380 | 3,890 | 600 |
| 4 | 1-nitroso-2-naphthol | 0.3 | 6 | 1:18 | 380 | 3,860 | 600 |
| 5 | Sodium p-nitrosophenol | 0.25 | 5 | 1:20 | 430 | 3,550 | 570 |
| 6 | N-p-dinitroso-N-methylaniline | 0.33 | 6 | 1:14 | 720 | 4,200 | 480 |
| 7 | m-Dinitrobenzene | 0.01 | 0.2 | 1:500 | 430 | 3,700 | 600 |
| 8 | Diphenyl picryl hydrazyl | 0.5 | 9 | 1:24 | 460 | 3,640 | 560 |
| 9 | Dibenzoyl benzoquinone dioxime | 0.5 | 9 | 1:22 | 620 | 3,440 | 490 |
| 10 | Cyclohexene nitrosate [1] | 0.25 | 5 | 1:21 | 510 | 3,400 | 500 |
| 11 | 1-octene nitrosate [1] | 0.25 | 5 | 1:25 | 460 | 3,360 | 510 |

[1] Made from N$_2$O$_4$ and the olefine at 10° C. The cure is for 30 minutes at 153° C. in each case.

As many widely different embodiments of this invention may be made without departing from the spirit and scope thereof, it is to be understood that this invention is not limited to the specific embodiments thereof except as defined in the appended claims.

What is claimed is:

1. In a process for curing elastomeric chlorosulfonated polyethylenes in the presence of (A) a member selected from the group consisting of polyvalent metal oxides, polyvalent metal hydroxides and weak acid salts of polyvalent metals and (B) monocarboxylic acids selected from the group consisting of the aliphatic and cycloaliphatic series of molecular weight above 200 and mixtures thereof, the improvement which comprises adding 0.005 to 0.5 part per 100 parts by weight of said chlorosulfonated polyethylenes of at least one non-volatile compound selected from the group consisting of inorganic nitrites, organic nitro compounds, organic nitroso compounds and organic oximino compounds where in said respective organic compounds a nitro, nitroso or oximino group is directly attached to a carbon atom.

2. A process as described in claim 1 wherein said non-volatile compound is a metallic nitrite.

3. A process as described in claim 1 wherein said non-volatile compound is sodium nitrite.

4. A process as described in claim 1 wherein said non-volatile compound is an organic nitro compound wherein at least one of said nitro groups of said compound is directly attached to a carbon atom.

5. A process as described in claim 1 wherein said non-volatile compound is dinitrotoluene.

6. A process as described in claim 1 wherein said non-volatile compound is an organic nitroso compound wherein at least one of said nitroso groups of said compound is directly attached to a carbon atom.

7. A process as described in claim 1 wherein said non-volatile compound is N-nitroso-p-nitroso-N-methylaniline.

8. A process as described in claim 1 wherein said non-volatile compound is dibenzoyl benzoquinone dioxime.

9. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile compound selected from the group consisting of inorganic nitrites, organic nitro compounds, organic nitroso compounds, and organic oximino compounds where in said respective organic compounds a nitro, nitroso or oximino group is directly attached to a carbon atom; and a member selected from the group consisting of solid aliphatic monocarboxylic acids of molecular weight above 200, solid cycloaliphatic monocarboxylic acids of molecular weight above 200, and mixtures of said aliphatic and cycloaliphatic monocarboxylic acids; and inert finely divided fillers for chlorosulfonated polyethylene.

10. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile compound selected from the group consisting of inorganic nitrites, organic nitro compounds, organic nitroso compounds, and organic oximino compounds where in said respective organic compounds a nitro, nitroso or oximino group is directly attached to a carbon atom, a solid aliphatic monocarboxylic acid of a molecular weight above 200, and an inert finely divided filler for chlorosulfonated polyethylene.

11. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile compound selected from the group consisting of inorganic nitrites, organic nitro compounds, organic nitroso compounds, and organic oximino compounds where in said respective organic compounds a nitro, nitroso or oximino group is directly attached to a carbon atom, a solid cycloaliphatic monocarboxylic acid of molecular weight of above 200, and an inert finely divided filler for chlorosulfonated polyethylene.

12. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile compound selected from the group consisting of inorganic nitrites, organic nitro compounds, organic nitroso compounds, and organic oximino compounds where in said respective organic compounds a nitro, nitroso or oximino group is directly attached to a carbon atom, a mixture of solid aliphatic and cycloaliphatic monocarboxylic acids of molecular weight above 200, and an inert finely divided filler for chlorosulfonated polyethylene.

13. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile compound selected from the group consisting of inorganic nitrites, organic nitro compounds, organic nitroso compounds, and organic oximino compounds where in said respective organic compounds a nitro, nitroso or oximino group is directly attached to a carbon atom, and hydrogenated rosin.

14. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of a metallic nitrite and hydrogenated rosin.

15. A mixture comprising chlorosulfonated polyethylenes; a member of the group of polyvalent metal oxides, polyvalent metal hydroxides or weak acid salts of a polyvalent metal and an amount sufficient to cure said chlorosulfonated polyethylenes of a composition having from 0.2 to 10% by weight of at least one non-volatile organic nitroso compound wherein a nitroso group of said compound is directly attached to a carbon atom, and hydrogenated rosin.

References Cited by the Examiner

UNITED STATES PATENTS

| | | | |
|---|---|---|---|
| 2,416,060 | 2/1947 | McAlevy et al. | 260—79.3 |
| 2,606,842 | 8/1952 | Price | 260—100 |
| 2,683,103 | 7/1959 | Smook et al. | 260—79.3 |

OTHER REFERENCES

Latimer and Hildebrand: "Reference Book of Inorganic Chemistry" Appendix XI at page 562, 3rd edition, Macmillan Co., 1951.

JOSEPH L. SCHOFER, *Primary Examiner.*

JAMES A. SEIDLECK, *Examiner.*

J. F. McNALLY, D. DENENBERG,
*Assistant Examiners.*